United States Patent [19]

Kohno

[11] Patent Number: 5,688,597
[45] Date of Patent: Nov. 18, 1997

[54] TIRE CORE

[75] Inventor: Masatsugu Kohno, Kobe, Japan

[73] Assignee: Sumitomo Rubber Industries, Ltd., Hyogo-ken, Japan

[21] Appl. No.: 509,893

[22] Filed: Aug. 1, 1995

[30] Foreign Application Priority Data

Aug. 8, 1994 [JP] Japan ................................. 6-208127
Aug. 23, 1994 [JP] Japan ................................. 6-222415

[51] Int. Cl.$^6$ ........................................... B32B 15/00
[52] U.S. Cl. .................... 428/379; 428/364; 428/377; 428/373; 57/210; 57/215; 57/207; 57/902; 152/451; 152/527; 152/535; 152/556
[58] Field of Search .......................... 152/451, 458, 152/526, 527, 535, 537, 556, 548, 564, 531, 533, 359, 361; 57/210, 230, 216, 218, 902, 205, 213, 217, 223, 228, 236, 241, 510, 215; 428/374, 373, 377, 379, 364

[56] References Cited

U.S. PATENT DOCUMENTS

| 4,328,852 | 5/1982 | Poque et al. ....................... 152/359 |
|---|---|---|
| 5,213,640 | 5/1993 | Ikehar ................................... 152/451 |
| 5,221,384 | 6/1993 | Takahashi et al. ................ 152/451 |
| 5,321,941 | 6/1994 | Bollen et al. . |
| 5,327,713 | 7/1994 | Sakon .................................... 57/213 |
| 5,351,470 | 10/1994 | Shimura ................................ 57/213 |
| 5,400,580 | 3/1995 | Kuriya et al. ........................ 57/213 |
| 5,439,741 | 8/1995 | Gibbon et al. ...................... 428/377 |

Primary Examiner—Merrick Dixon
Attorney, Agent, or Firm—Birch, Stewart, Kolasch & Birch, LLP.

[57] ABSTRACT

A tire cord which is improved in rubber penetration. The cord has at least four filaments twisted together so as to form a core and a sheath surrounding the core. The filaments change place repeatedly along the longitudinal direction of the cord such that one of the filaments forms the core in a portion, but in a different portion of the cord, the same filament forms part of the sheath.

7 Claims, 6 Drawing Sheets

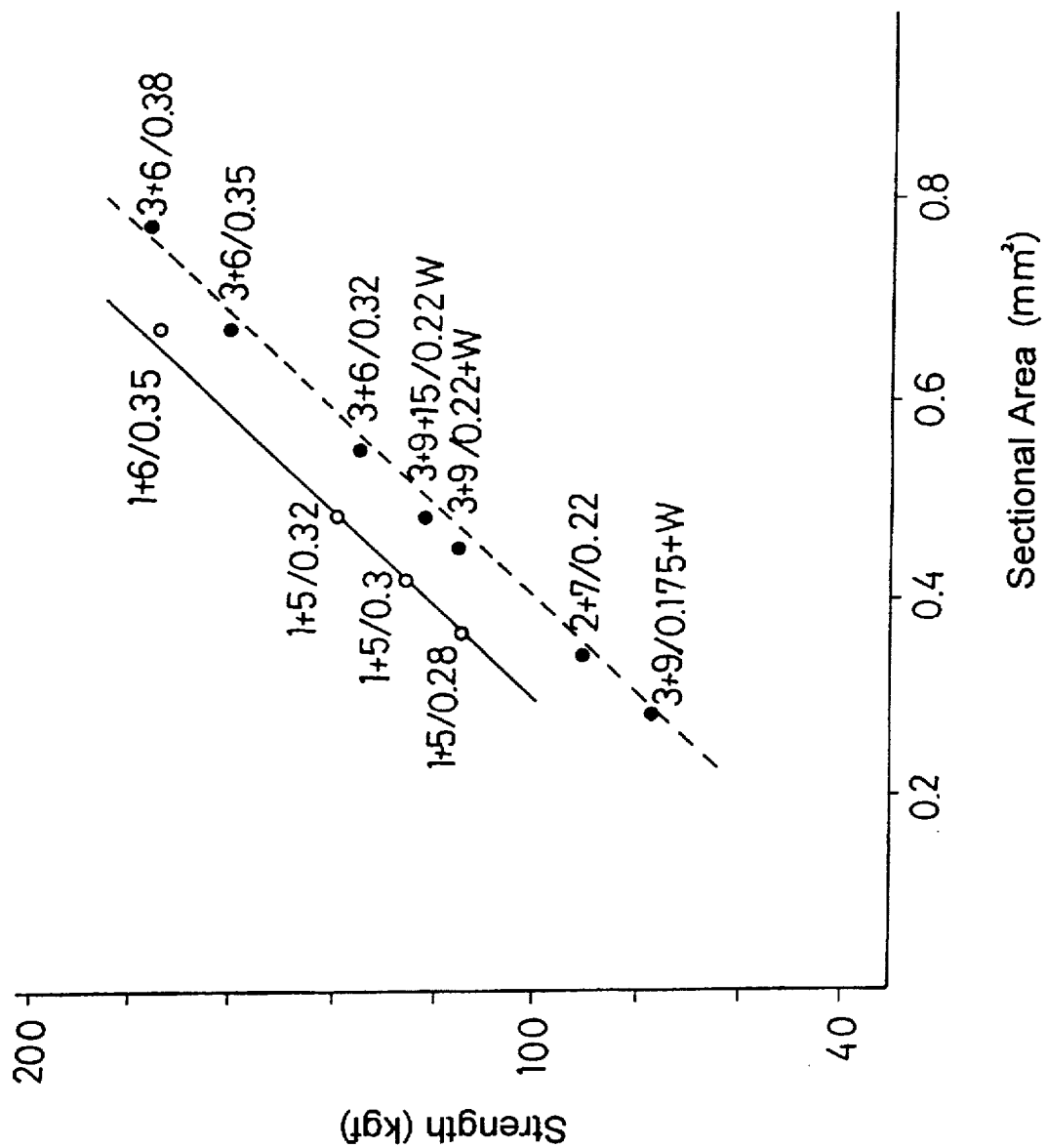

TIRE CORE

The present invention relates to a cord for reinforcing a tire, which is improved in rubber penetration, more particularly to a cord comprising several filaments twisted together.

BACKGROUND OF THE INVENTION

Conventional structures of the steel cords used to reinforce a tire are as follows:

(1) nXm structure (e.g. 7×4 and 4×4) comprising the number n of strands twisted together, each strand consisting of the number m of the filaments twisted together, for example such a cord is disclosed in Japanese Patent application laid-open No.62-96104;

(2) n+m structure (e.g. 3+9) comprising a core consisting of the number n (2 to 4) of filaments twisted together and a sheath consisting of the number m of filaments twisted around the core, for example such a cord is disclosed in Japanese Patent application laid-open No.5-29410; and (3) 1+m structure (e.g. 1+6) comprising a core consisting of a single filament and a sheath consisting of the number m of filaments twisted around the core, for example such a cord is disclosed in Japanese Patent application laid-open No.56-31090.

In structure (1), the weight and diameter of the cord per its strength are high, and the penetration of topping rubber into the cord is not good.

In structure (2), the cord weight is relatively large since the cord becomes compact, and the rubber penetration is not good.

In structure (3), the cord strength is larger than that of the structure (2) cord if they are the same weight, but the rubber penetration is inferior. Further, the core is liable to be pulled out.

In order to solve the above-mentioned problems, it was proposed to decrease the number m of the filaments forming the sheath in the above-mentioned structure (2) and (3) to the number m'. That is, (4) 1+m' structure, and (5) n+m' structure, where m'<m.

In structure (4), the cord strength becomes larger than that of a structure (3) cord having the same weight, and the rubber penetration can be somewhat improved, but the pull-out resistance of the core is still not good.

In the structure (5), the rubber penetration into between the core and sheath can be improved in comparison with the structure (2), but the penetration into the central space of the core can not be improved. Further, the cord weight becomes larger than that of the structure (3) cord having the same strength.

Therefor, Japanese Patent application laid-open No 62-141144 proposes (6) n/d1+m/d2 structure (e.g. 3/0.20+6/0.32) comprising a core consisting of the number n of filaments having a diameter d1 and a sheath consisting of the number m of filaments having a diameter d2 which is not equal to d1.

However, this structure is still not improved in the rubber penetration into the central space of the core.

SUMMARY OF THE INVENTION

It is therefore, an object of the present invention to provide a cord for reinforcing a tire, in which the penetration of topping rubber into the cord and pull-out resistance of the core are improved, without increasing the diameter and weight of the cord, and thereby durability of the tire can be improved without increasing the tire weight.

According to one aspect of the present invention, a tire cord comprises at least three filaments twisted together so as to form a core and a sheath surrounding the core, wherein the filaments change place repeatedly along the longitudinal direction of the cord such that one of the filaments forms the core in a portion, but in a different portion of the cord, the same filament forms part of the sheath.

Preferably, all the filaments are the same diameter, the diameter is in the range of from 0.20 to 0.40 mm, and the total number of the filaments is in the range of from 3 to 7.

Since the filaments repeatedly change place, through the transitional part, the topping rubber easily penetrates into the cord. Therefore, when the filaments are of steel, the corrosion resistance of the cord is improved, and the occurence of corrosion due to the remaining air among the filaments and a decrease in the strength can be prevented.

In contrast with the above-mentioned conventional 1+m and 1+m' structures, all the filaments inclusive of the core filament are twisted together. Accordingly, the pull-out resistance of the core is remarkably increased. Further, all the filaments become the substantially same length. Accordingly, a stress concentration on a particular filament (such as the conventional core filament) can be avoided, and the load is evenly shared with the filaments, and the durability of the cord is effectively improved. Therefore, the cord can effectively improve the durability of a tire.

Further, the cord generally has the 1+m or 1+m' structure, that is, a single-filament core. Therefore, as shown in FIG. 5, the cord strength becomes higher than the multi-filament core if the cords are the same sectional area. In other words, when the cord strength is the same, the cord weight is decreased, and the tire weight can be decreased.

BRIEF DESCRIPTION OF THE DRAWINGS

Embodiments of the present invention will now be described in detail in conjunction with the accompanying drawings.

FIG. 5 is a graph showing a relationship between the strength and total sectional area of various cords having a single-filament core and a multi-filament core.

DETAILED DESCRIPTION OF THE INVENTION

Figure 1:
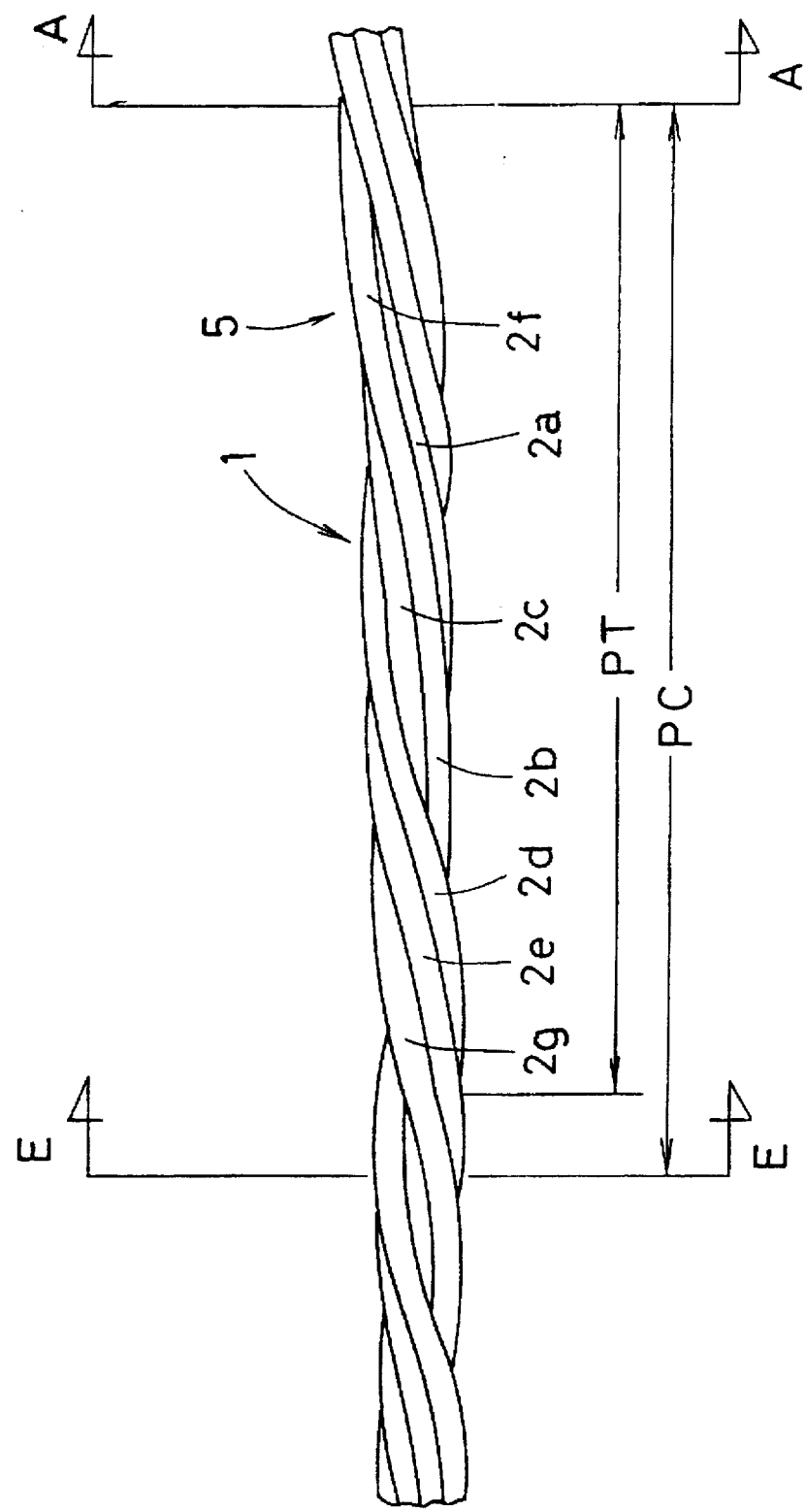
FIG. 1 is an enlarged view of an embodiment of the present invention.

In the drawings, the cords 1 according to the present invention comprises at least three steel filaments 2 twisted together.

The filaments 2 are twisted together at a predetermined pitch PT so that one of the filaments 2 forms a core 3 located in the center of the cord, and the remaining filaments 2 form a sheath 4 surrounding the core 3.

According to the invention, one filament which forms the core 3 changes place with one of the filaments which form the sheath 4 at a predetermined pitch along the length of the cord.

Preferably, the filaments 2 change place in regular order or a predetermined order, but it may be possible to change in random order.

The filaments 2 illustrated in FIGS. 1–4 are made of steel.

Preferably, the total number of the filaments 2 is in the range of from 3 to 7, and all the filaments 2 are the same diameter, and the diameter of each filament 2 is in the range of from 0.20 to 0.40 mm.

The filaments 2 may be made of organic fibers, e.g. nylon, aromatic polyamide fiber and the like.

FIGS. 1 and 2(A)–(E) show an example cord consisting of steel filaments 2a–2g. In this example, seven filaments 2a–2g are Z-twisted and change place as shown in FIG. 2(A)–(E).

Figure 2A:
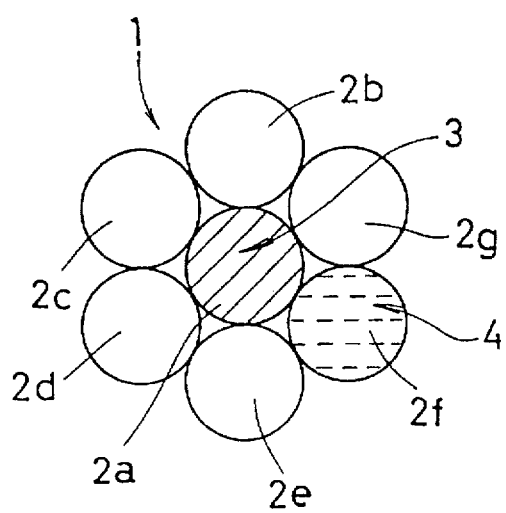
FIG. 2 (A) to (E) are cross sectional views of the embodiment of FIG. 1.

FIG. 2(A) shows a cross sectional view taken along the line A—A of FIG. 1. In this part, the core 3 is the filament 2a, and the remaining six filaments 2b, 2c, 2d, 2e, 2f and 2g define the sheath 4. All the adjacent filaments contact each other. Between the adjacent sheath filaments 2b–2g, no gap is formed. The diameters of the filaments 2 are so selected from the above-mentioned range.

Figure 2B:
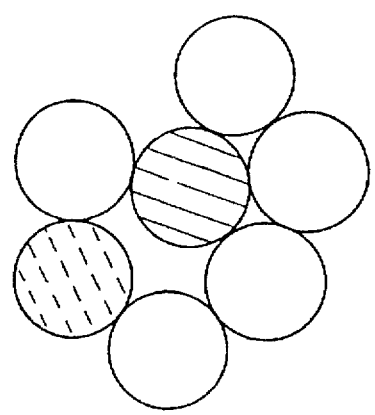
Figure 2C:
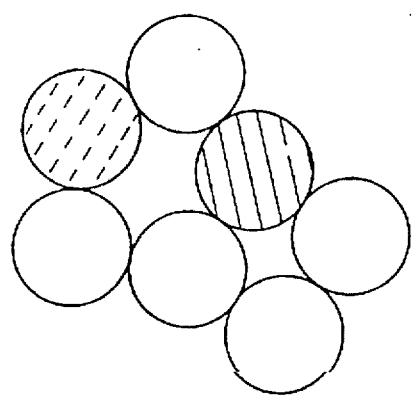
Figure 2D:
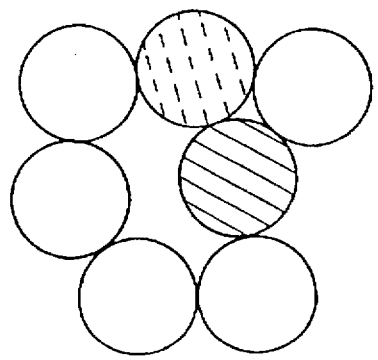
Figure 2E:
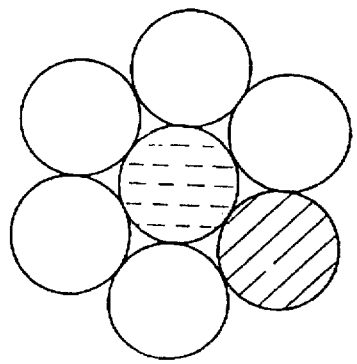

The filament 2a gradually changes place with the filament 2f, and in a different part spaced apart by a certain pitch PC, the filament 2f becomes the core 3 and the filament 2a becomes one of the sheath filaments as shown in FIG. 2(E).

FIGS. 2(B)–(D) show transitional points therebetween. The triangular spaces formed among the filaments shown in FIG. 2(A) and (B) are opened through the change of the filaments as shown in FIG. 2(B)–(D).

Such a change is repeated along the longitudinal direction of the cord at the pitch PC. The pitch PC is preferably in the range of from 1.0 to 10.0 times, more preferably 1.0 to 3.0 times the twist pitch PT of the sheath filaments. For example, PC=2.0 PT.

If the pitch PC is less than 1.0 times the twist pitch PT, the strength of the cord decreases, and the cord loses straightness. If PC is more than 10.0 times PT, the rubber penetration becomes insufficient, and the cord is liable to fatigue.

FIGS. 3 and 4(A)–(D) show another example cord consisting of steel filaments 2a–2f. In this example, six filaments 2a–2f are Z-twisted and change place as shown in FIG. 4(A)–(D).

In this example, the diameters of the filaments 2 are selected from the above range such that when the sheath filaments are arranged around the core filament at angularly equal pitches, a small gap G is formed between the adjacent sheath filaments, thereby topping rubber easily penetrates into the cord through the gap.

Figure 3:
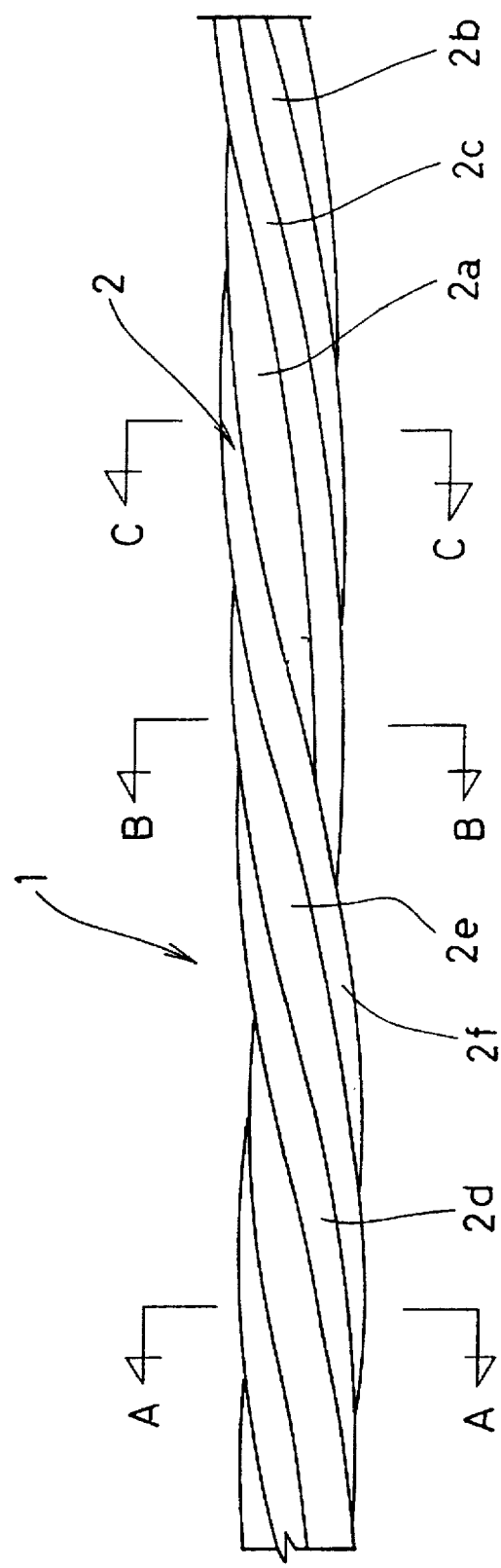
FIG. 3 is an enlarged view of another embodiment of the present invention.
Figure 4A:
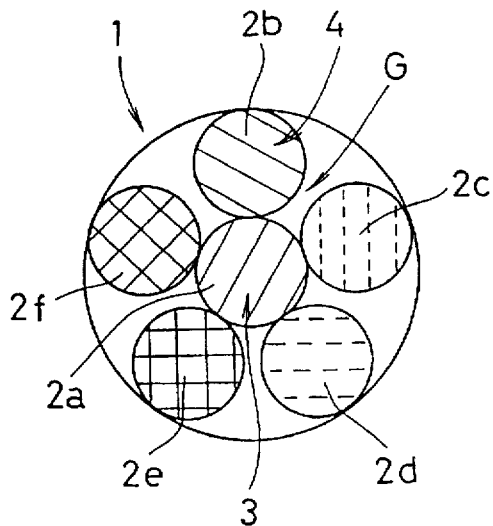
FIG. 4 (A) to (D) are cross sectional views of the embodiment of FIG. 3.

FIG. 4(A) shows a cross sectional view taken along the line A—A of FIG. 3. In this part, the core 3 is the filament 2a, and the remaining five filaments 2b, 2c, 2d, 2e and 2f define the sheath 4. Between the sheath filaments, a gap G may be formed as explained above.

Figure 4B:
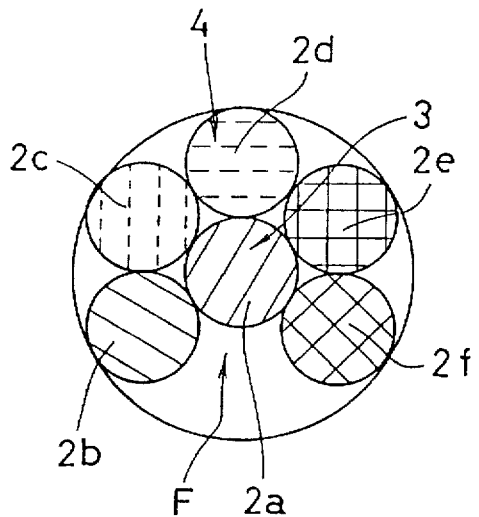
Figure 4C:
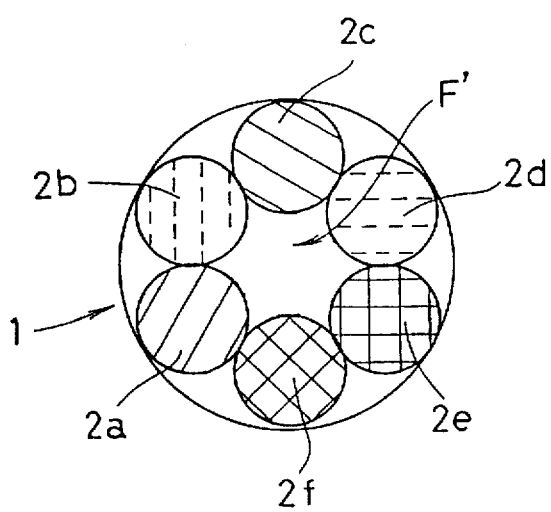
Figure 4D:
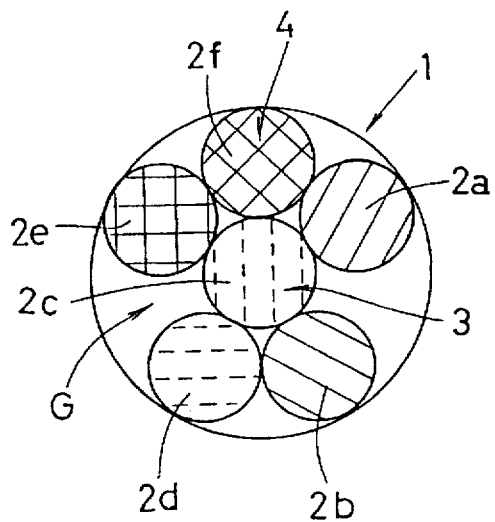

The filament 2a gradually changes place with the filament 2c, and in a different part spaced apart by a certain pitch PC, the filament 2c becomes the core 3 and the filament 2a becomes one of the sheath filaments as shown in FIG. 4(D).

FIGS. 4(B) and (C) show transitional points therebetween.

FIG.4 (B) is a cross sectional view taken along the line B–B of FIG. 3. In this transitional point, the adjacent sheath filaments 2b, 2c, 2d, 2e and 2f contact with each other, and as a result a wide gap F substantially equal to the filament diameter d is formed between the filaments 2b and 2f.

FIG. 4(C) is a cross sectional view taken along the line C–C of FIG. 3. In this point, the core filament 2a moves into the above-mentioned wide gap F, and as a result, no core exists in the center of the cord. Although the cord generally has a 1+5 structure, this transitional point appears to be a 0+6 structure. Then, the filament 2c moves into the central space F'. That is, the filaments 2a and 2c change place.

The change of the filaments is repeated in the same way along the longitudinal direction of the cord.

Figure 6:
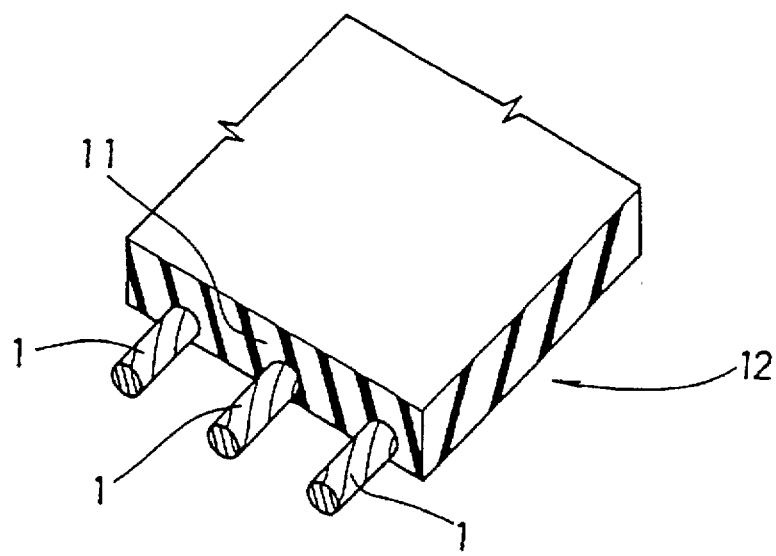
FIG. 6 is a schematic partial perspective view of a rubber sheet in which the cords are embedded.

For example, as shown in FIG. 6, the cords 1 according to the present invention are laid parallel with each other and embedded in a topping rubber compound 11 in a form of sheet 12. Such sheet 12 is cut in a suitable size and used as tire reinforcing material such as a carcass ply, a belt ply, a bead reinforcing layer and the like.

* TEST EXAMPLES

Steel cords provided with gaps between the sheath filaments as shown in FIGS. 3 and 4 were made and tested as follows. The specifications thereof and test results are given in Table 1.

Another type of steel cords were also made and tested in the same way. The cord has a structure different from the above examples. That is, no gap is formed between the sheath filaments in the part with the core as shown in FIGS. 1 and 2. The specifications thereof and test results are given in Table 2.

1) Rubber penetration test

First, a tire was made using the test cords, and then the cords were taken out from the tire together with the surrounding topping rubber. The cords and rubber were put in toluene for 48 hours, and the swelled topping rubber was removed. The cord is disassembled into the individual filaments 2, and the percentage of the rubber-coated area thereof to the total area was measured along about 5 cm length. Therefore, the higher the percentage, the better the rubber penetration.

2) Bending rigidity test

The bending rigidity of the cord was measured with "V-5 Rigidity Tester", a U.S. TABER made tester relating to U.S. Pat. Nos. 2,465,180 and 2,063,275.

3) Pull-out resistance test

This test was made as follows.

First, a tire was made, in which the test cords were embedded in parallel with each other as a reinforcing layer or ply, and then a test piece was taken out from the tire.

Figure 7:
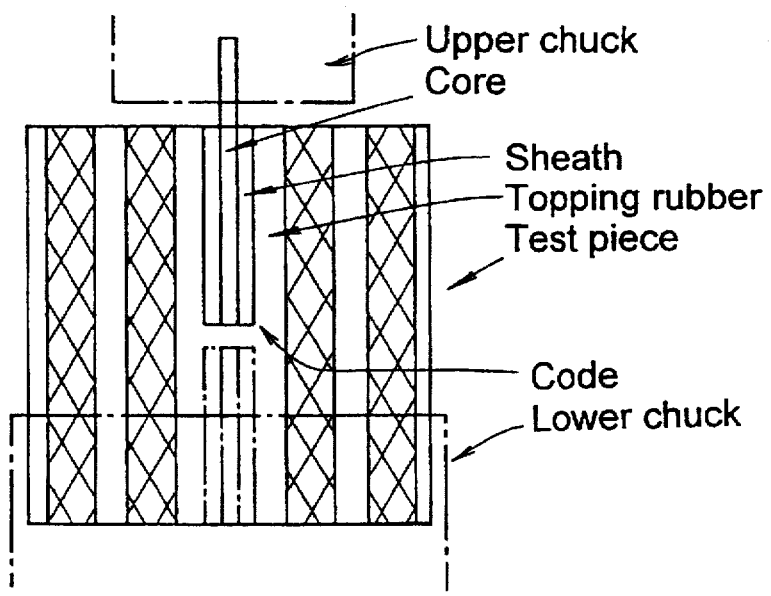
FIG. 7 is a schematic view explaining a test method for measuring the pull-out resistance of a core.

Here, the test piece is, as shown in FIG. 7, a strip of topping rubber in which five parallel cords are disposed along the longitudinal direction. Therefore, the width thereof is substantially equal to five times the cord pitch. The length thereof is about 60 mm. Nothing protrudes from one end (the lower end in FIG. 7). From the other end (the upper end), however, only one core which is of the central cord protrudes. The central cord is cut at 15 mm from the upper end.

Holding the protruding core and the lower end of the test piece with an upper chuck and a lower chuck, a tensile force was applied therebetween and the force was gradually increased, as the result of which, when (1) the core was pulled out, (2) the core was cut, or (3) the topping rubber was broken between the target central cord and the adjacent cord, the tensile force was measured as the pull-out resistance. In each Table, the resistance is indicated by an index. The larger the index, the larger the pull-out resistance.

As apparent from Tables 1 and 2, it was confirmed that Example cords were effectively improved in the rubber penetration and the pull-out resistance of the core in comparison with the corresponding Reference cords.

As described above, in the cords according to the present invention, the rubber penetration and the pull-out resistance of the core are effectively improved. Therefore, the cords can remarkably improve the durability of a tire, without increasing the tire weight.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A tire cord comprising from four to seven filaments twisted together so as to form a core and a sheath surrounding the core, wherein
    said from four to seven filaments change place repeatedly along the longitudinal direction of the cord such that one of the filaments forms the core in a portion, but in a different portion of the cord, said one of the filaments forms part of the sheath, thereby defining a plurality of first parts with the core and a plurality of second parts without the core which are disposed alternately in the longitudinal direction of the cord, wherein each of the first parts consists of the core consisting of one of the filaments and the sheath consisting of all the remaining filaments surrounding the core, and each of the second parts is defined by the sheath consisting of all said four to seven filaments surrounding a central space.
2. The tire cord according to claim 1, wherein
    the pitch of the second parts is in the range of from 1.0 to 10.0 times the twist pitch of the sheath filaments.

TABLE 1

| Code | Ex. 1 | Ref. 1A | Ref. 1B | Ref. 1C | Ref. 1D | Ex. 2 | Ref. 2A | Ref. 2B | Ref. 2C | Ref. 2D | Ref.3A | Ref. 3B |
| --- | --- | --- | --- | --- | --- | --- | --- | --- | --- | --- | --- | --- |
| Structure | | | | | | | | | | | | |
| Type* | 1 + 5/ 0.25 | 1 + 5/ 0.25 | 2 + 7/ 0.22 +W | 1 + 6/ 0.25 | 3 + 9/0.22 +W | 1 + 5/0.35 HT | 3/0.20 + 6 /0.32HT | 3/0.175 + 6/0.32 | 3/0.20 + 6/0.35 | 1 + 5/0.35 HT | 3 + 9 + 15 /0.175 +W | 1 + 6/ 0.35 |
| Changing place | yes | no | no | no | no | yes | no | no | no | no | no | no |
| Strength (kgf) | 80 | 73 | 85 | 84 | 115 | 170 | 170 | 135 | 160 | 134 | 165 | 172 |
| Diameter (mm) | 0.75 | 0.75 | 1.07 | 0.75 | 1.16 | 1.05 | 1.07 | 1.04 | 1.13 | 1.05 | 1.34 | 1.05 |
| Section area (sq.mm) | 0.295 | 0.295 | 0.418 | 0.344 | 0.456 | 0.577 | 0.577 | 0.555 | 0.672 | 0.577 | 0.649 | 0.673 |
| Test Result | | | | | | | | | | | | |
| Rubber penetration (%) | 98 | 98 | 30 | 10 | 3 | 98 | 80 | 45 | 50 | 98 | 3 | 10 |
| Bending rigidity | 30 | 32 | 30 | 38 | 41 | 150 | 91 | 89 | 129 | 155 | 40 | 175 |
| Pull-out resistance | 4800 | 100 | 400 | 12 | 480 | 4700 | 720 | 560 | 640 | 15 | 400 | 12 |

*HT: High tensile steel wire
W: with Wrapping wire

TABLE 2

| Code | Ex. 1 | Ref. 1 | Ref. 2 | Ref. 3 |
| --- | --- | --- | --- | --- |
| Structure | | | | |
| Type | 1 + 6/0.25 | 1 + 5/0.25 | 1 + 6/0.25 | 3 + 9/0.22 |
| Material | steel | steel | steel | steel |
| Changing place | yes | no | no | no |
| Strength (kgf) | 111 | 84 | 93 | 115 |
| Diameter (mm) | 0.75 | 0.75 | 0.75 | 1.16 |
| Section area (sq.mm) | 0.344 | 0.295 | 0.344 | 0.456 |
| Test Result | | | | |
| Rubber penetration (%) | 93 | 98 | 10 | 3 |
| Bending rigidity | 35 | 32 | 38 | 41 |
| Pull-out resistance | 800 | 100 | 12 | 480 |

3. The tire cord according to claim 1, wherein all the filaments are made of steel.
4. The tire cord according to claim 1, wherein the diameter of each of the filaments is in the range of from 0.20 to 0.40 mm.
5. The tire cord according to claim 1, wherein all the filaments are the same diameter.
6. The tire cord according to claim 2, wherein, in the first parts with the core, each of the filaments forming the sheath contacts with at least one of the adjacent filaments.
7. The tire cord according to claim 2, wherein, in the first parts with the core, at least one gap is formed between the filaments forming the sheath.

* * * * *